(12) United States Patent
Hosono et al.

(10) Patent No.: US 6,296,013 B1
(45) Date of Patent: Oct. 2, 2001

(54) PRESSURE/FLOW RATE CONTROL VALVE

(75) Inventors: Masayuki Hosono, Toride; Qinghai Yang, Ichikawa, both of (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/518,093

(22) Filed: Mar. 3, 2000

(30) Foreign Application Priority Data

Mar. 10, 1999 (JP) .................................................. 11-063811
Jul. 14, 1999 (JP) .................................................. 11-200727

(51) Int. Cl.[7] .................................................. F16K 17/18
(52) U.S. Cl. ..................... 137/493.7; 137/454.5; 137/599.11; 137/516.15; 137/601.21; 251/148
(58) Field of Search ................... 137/493.7, 454.5, 137/493.8, 599.11, 599.09, 601.21, 601.19, 516.15; 251/148

(56) References Cited

U.S. PATENT DOCUMENTS 4,197,874 * 4/1980 Neff ...................................... 137/270
4,450,861 * 5/1984 Bouteille .............................. 137/553
5,477,829 * 12/1995 Hassinger et al. .................... 123/467
6,131,610 * 10/2000 Morisako et al. ............... 137/601.21

FOREIGN PATENT DOCUMENTS 59-12404  4/1984 (JP) .

* cited by examiner

Primary Examiner—Stephen M. Hepperle
(74) Attorney, Agent, or Firm—Oblon, Spivak, McClelland, Maier & Neustadt, P.C.

(57) ABSTRACT

Disclosed is a pressure/flow rate control valve comprising a valve-opening/closing section having a valve plug which is installed with an elastic member having a substantially tapered cross section at one end, a stem which is displaceable integrally with the valve plug and which is installed with a packing disposed between a pair of disk sections separated from each other by a predetermined spacing distance, and a spring member which is fastened to one end of the stem, for seating the valve plug on an annular projection in accordance with the action of resilient force.

6 Claims, 10 Drawing Sheets

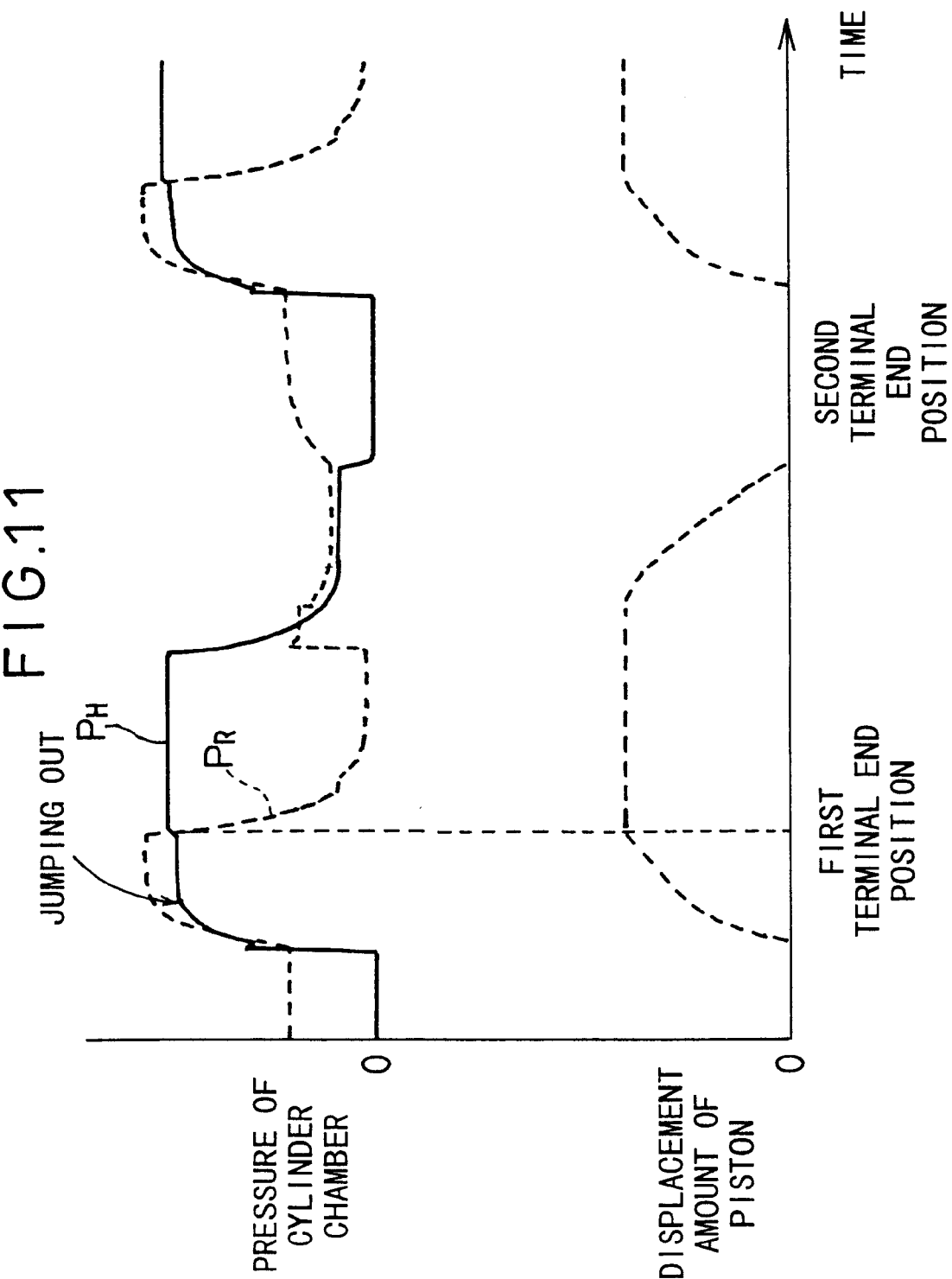

PRESSURE/FLOW RATE CONTROL VALVE

BACKGROUND OF THE INVENTION

1. Field of the Invention

The present invention relates to a pressure/flow rate control valve which makes it possible to control the pressure and the flow rate of a pressure fluid supplied to or discharged from an actuator such as a cylinder.

2. Description of the Related Art

A pressure/flow rate control valve has been hitherto known, which is used to control the pressure and the flow rate of a pressure fluid supplied to or discharged from an actuator such as a cylinder.

In order to solve the delay of the initial starting time, the present applicant has suggested a pressure/flow rate-adjusting valve comprising a pressure control section for quickly supplying the supply pressure to the inside of a cylinder in a free flow manner to drive the cylinder, while quickly discharging the pressure from the cylinder until arrival at a preset pressure, and a flow rate-adjusting section for controlling the movement speed of the cylinder by adjusting a throttle valve during the exhaust process based on the meter-out control (see Japanese Utility Model Publication No. 59-12404).

SUMMARY OF THE INVENTION

A general object of the present invention is to provide a pressure/flow rate control valve which makes it possible to decrease the time loss resulting from the difference in pressure between a first cylinder chamber and a second cylinder chamber when a piston is started at a low pressure.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 11 illustrates characteristic curves of a pressure/flow rate control valve concerning an exemplary conventional technique.

DESCRIPTION OF THE PREFERRED EMBODIMENTS

Figure 1:
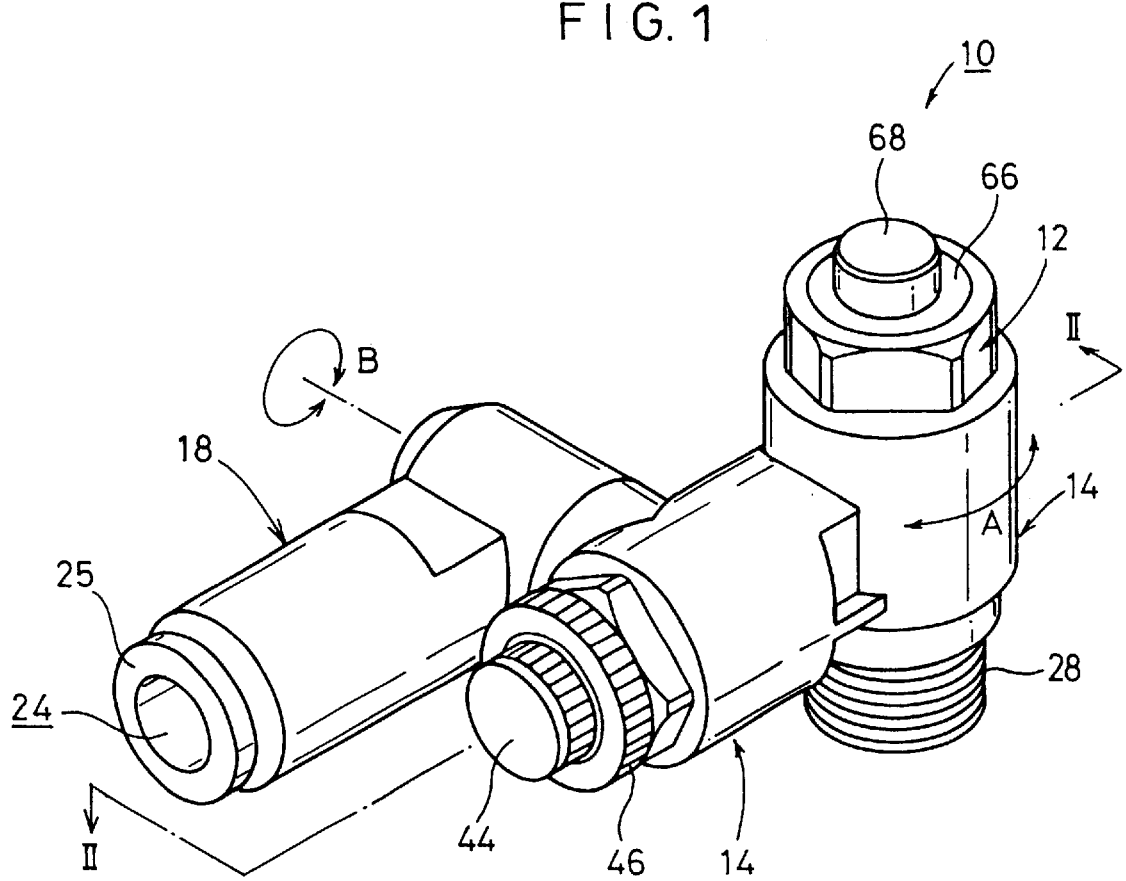
FIG. 1 shows a perspective view illustrating a pressure/flow rate control valve according to an embodiment of the present invention.

With reference to FIG. 1, reference numeral 10 indicates a pressure/flow rate control valve according to an embodiment of the present invention.

The pressure/flow rate control valve 10 comprises a second valve body 14 which is composed of two substantially cylindrical members integrally joined in directions substantially perpendicular to one another and which is rotatable in the direction of the arrow A about a center of rotation of an internally fitted first valve body 12 having a cylindrical configuration, and a third valve body 18 which has a bent substantially L-shaped configuration and which is joined rotatably in the direction of the arrow B about a center of rotation of a projection 16 (see FIG. 2) of the second valve body 14.

Figure 2:
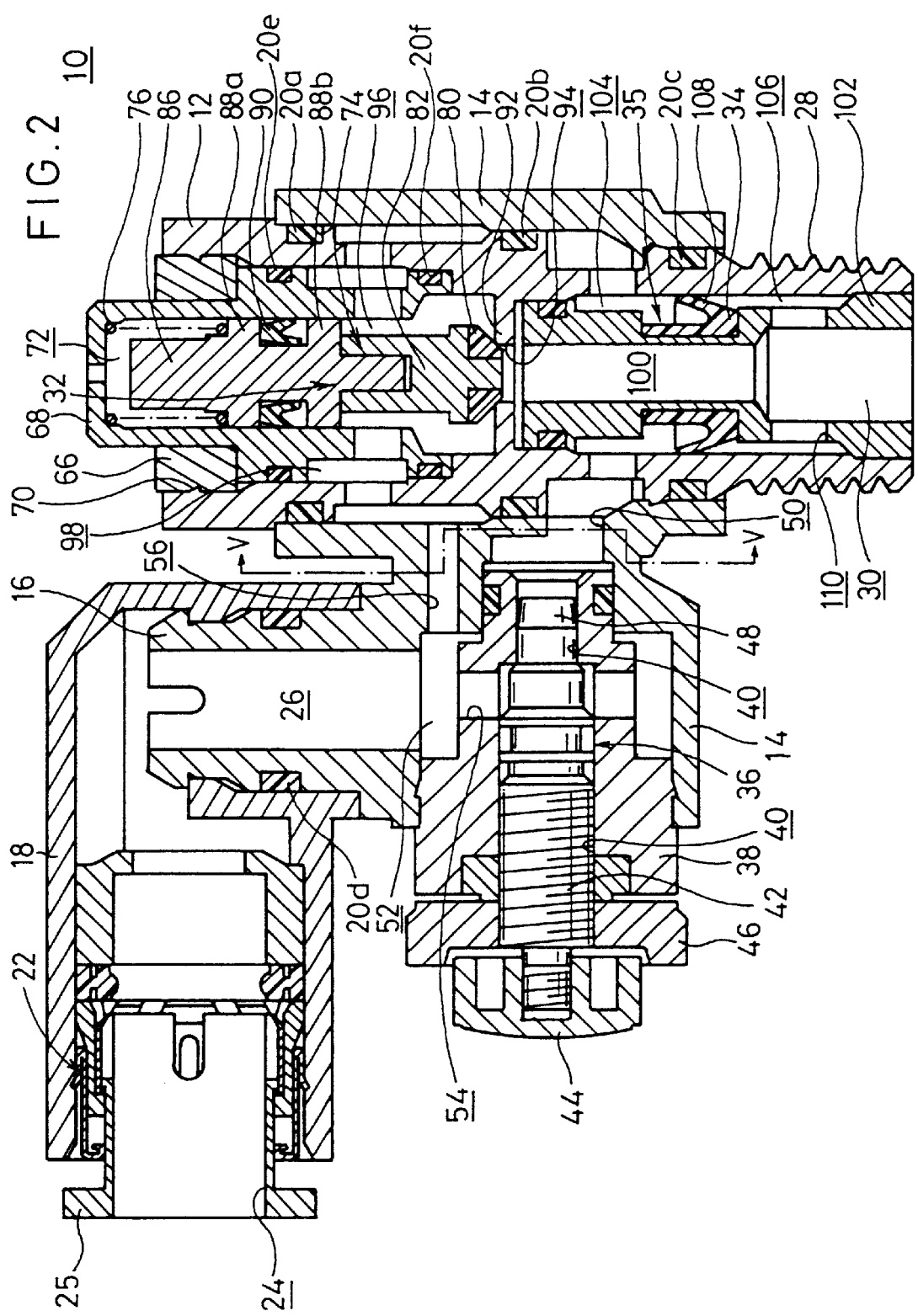
FIG. 2 shows a vertical sectional view taken along a line II—II shown in FIG. 1.

As shown in FIG. 2, ring-shaped first to third seal members 20a to 20c are installed to annular grooves on the outer circumferential surface of the first valve body 12. A ring-shaped fourth seal member 20d is installed to an annular groove on the projection 16 of the second valve body 14.

A tube joint section 22, which is connected to a pressure fluid supply source (described later on) via an unillustrated tube, is provided at one end of the third valve body 18. A known so-called one-touch joint is arranged for the tube joint section 22. The one-touch joint is arranged with a release bush 25 for disengaging the tube from the tube joint section 22 by being pushed, the release bush 25 having a hole which substantially functions as a primary port 24. The third valve body 18 is formed with a first passage 26 which is bent along the third valve body 18 and which communicates with the primary port 24.

A male thread section 28, which is screwed into a port of a cylinder as described later on, is formed on the outer circumferential surface at the lower end of the first valve body 12. A hole, which substantially functions as a secondary port 30, is formed on the inner circumferential surface of the male thread section 28. A valve-opening/closing section 32 for opening/closing a communication passage for making communication between the primary port 24 and the secondary port 30, and a check valve section 35 arranged with a check valve 34 are provided substantially coaxially at the inside of the first valve body 12. A flow rate-adjusting section 36, which makes communication and connection in parallel to the valve-opening/closing section 32 between the primary port 24 and the secondary port 30, is provided at the inside of the second valve body 14.

The tube joint section 22 and the flow rate-adjusting section 36 may be exchanged with each other so that the tube joint section 22 is arranged in the second valve body 14, and the flow rate-adjusting section 36 is provided in the third valve body 18.

As shown in FIG. 2, the flow rate-adjusting section 36 includes a substantially cylindrical holding member 38 which is internally fitted to the second valve body 14, an adjusting screw member 42 which extends along a stepped through-hole 40 formed at a central portion of the holding member 38 and which is held rotatably in the stepped through-hole 40, a knob section 44 which is joined to a first end of the adjusting screw member 42, and a nut member 46 for fixing the adjusting screw member 42 at a desired position. The first end 48 of the adjusting screw member 42 is formed to have a tapered cross section. The spacing distance between the first end 48 of the adjusting screw member 42 and the inner wall surface of the stepped through-hole 40 is adjusted by increasing or decreasing the screwing amount of the adjusting screw member 42 by the aid of the knob section 44. Therefore, the pressure fluid, which flows through the stepped through-hole 40, is throttled to have a predetermined flow rate in accordance with the spacing distance between the first end 48 of the adjusting screw member 42 and the inner wall surface of the stepped through-hole 40. The first end of the stepped through-hole 40 is formed to make communication with a second passage 50 (second communication passage) formed in the second valve body 14.

An annular first chamber 52 is formed between the outer circumferential surface of the holding member 38 and the inner circumferential surface of the second valve body 14. The first chamber 52 is formed to make communication with the stepped through-hole 40 via a third passage 54 which is substantially perpendicular to the stepped through-hole 40. Further, the first chamber 52 is formed to make communication with a fourth passage (first communication passage) 56 which extends substantially in parallel to the stepped through-hole 40.

Figure 5:
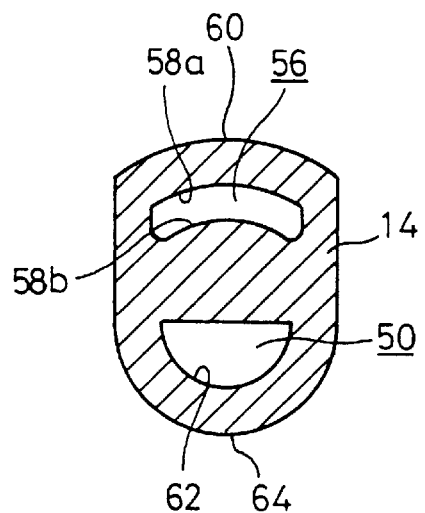
FIG. 5 shows a vertical sectional view taken along a line V—V shown in FIG. 2.

In this embodiment, as shown in FIG. 5, the second passage 50 and the fourth passage 56, which extend substantially in parallel to one another, are formed by being separated vertically from each other by a predetermined spacing distance. An upper inner wall surface 58a and a lower inner wall surface 58b of the fourth passage 56 is formed to have a curved configuration along the upper contour 60 of the second valve body 14. A lower inner wall surface 62 of the second passage 50 is formed to have a semicircular configuration along the lower contour 64 of the second valve body 14. The wall thickness of the second valve body 14 can be reduced, and the entire apparatus is allowed to have a small size and a light weight by forming the second passage 50 and the fourth passage 56 to have the cross-sectional configurations along the upper contour 60 and the lower contour 64 of the second valve body 14 respectively as described above.

As shown in FIG. 2, a bottom-equipped cap member 68 having a cylindrical configuration is held by the aid of a ring member 66 in an upper hole of the first valve body 12. Annular fifth and sixth seal members 20e, 20f are installed to annular grooves between the cap member 68 and the inner wall surface of the first valve body 12. The ring member 66 is fastened to the opening of the first valve body 12 by fastening, to an annular groove, an annular fastening pawl 70 formed on the inner circumferential surface of the first valve body 12.

A valve-opening/closing mechanism 74, which is slidable in the axial direction of the cap member 68, is provided in a second chamber 72 which is surrounded by the cap member 68. The valve-opening/closing mechanism 74 is always in a state of being urged downwardly by the resilient force of a spring member 76 fastened to the inner wall surface of the cap member 68.

In the embodiment of the present invention, the resilient force (spring force) of the spring member 76 is previously set to have a predetermined value. However, an unillustrated thread section may be formed on the cap member 68 to perform the operation based on the screwing system. Accordingly, it is also possible to control the secondary pressure by freely adjusting the resilient force of the spring member 76.

Figure 4:
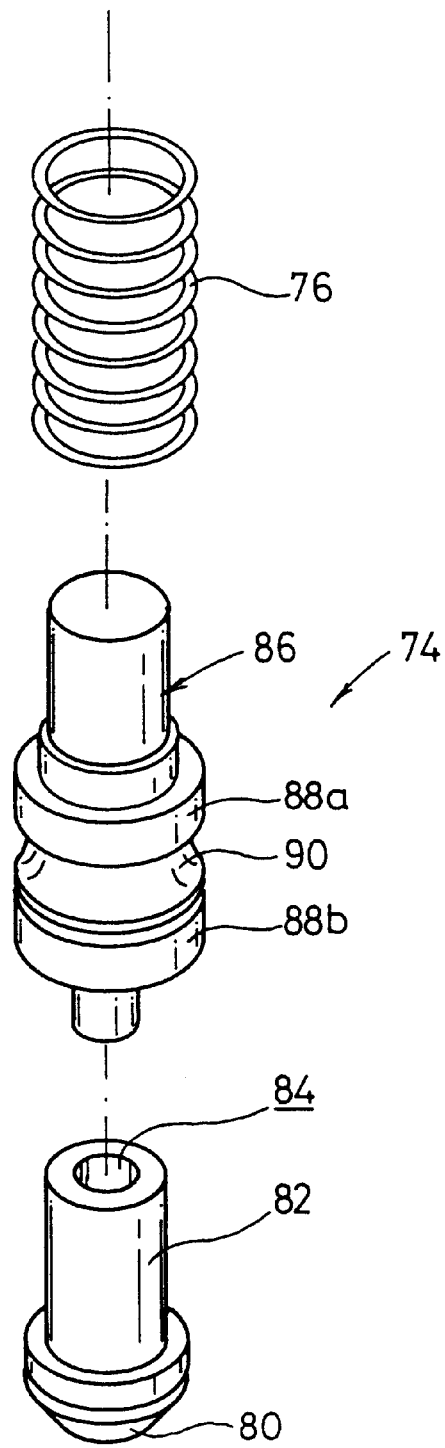
FIG. 4 shows an exploded perspective view illustrating a valve-opening/closing mechanism for constructing the pressure/flow rate control valve shown in FIG. 1.

As shown in FIGS. 2 and 4, the valve-opening/closing mechanism 74 includes a valve plug 82 which is installed with, at its first end, an elastic member 80 made of, for example, a material such as natural rubber and synthetic rubber to have a substantially tapered cross section, and a stem 86 which is integrally joined to a hole 84 formed at an upper portion of the valve plug 82. The stem 86 is formed with a pair of expanded disk sections 88a, 88b which have a substantially identical diameter and which are separated from each other by a predetermined spacing distance. A packing 90 having a substantially v-shaped cross section, which is made of a flexible material, is installed between the pair of disk sections 88a, 88b.

Figure 3:
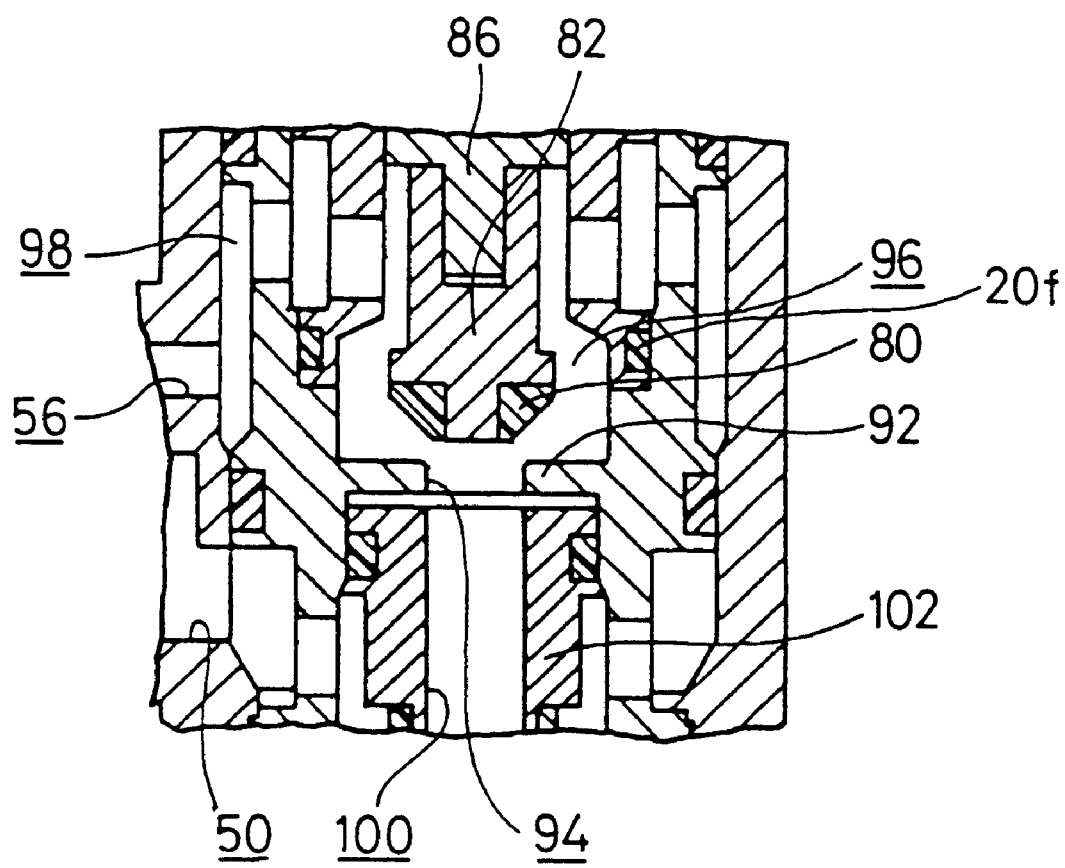
FIG. 3 shows, with partial omission, a vertical sectional view illustrating the valve-closed state in which a valve plug is displaced, and it is seated on a seat section.

In this embodiment, the valve-opening/closing mechanism 74 is in the valve-closed state when the elastic member 80, which is provided at the first end of the valve plug 82, is seated on an annular projection 92 formed on the first valve body 12, in accordance with the action of the resilient force of the spring member 76 (see FIG. 2). On the other hand, the valve-opening/closing mechanism 74 is in the valve-open state when the elastic member 80 of the valve plug 82 is separated from the annular projection 92 against the resilient force of the spring member 76 (see FIG. 3). The annular projection 92 functions as the seat section for the valve plug 82. The annular projection 92 is formed to make communication with the secondary port 30 via a hole 94 which is formed at a central portion of the annular. projection 92.

The valve-opening/closing mechanism 74 resides in an unbalance type in which the diameter of the disk section 88b to function as a pressure-receiving section of the valve plug 82 is set to be larger than the diameter of the annular projection 92 as the seat section. The valve-opening/closing mechanism 74 is designed such that the valve plug 82 is displaced upwardly, and it is separated from the seat section (annular projection 92) on the basis of the difference in pressure-receiving area between the disk section 88b and the annular projection 92.

A third chamber 96 for surrounding the valve plug 82 is formed at the joined portion between the valve plug 82 and the stem 86. The third chamber 96 is formed to make communication with the first chamber 52 via the fourth passage 56 and a fifth passage 98 having a bent configuration formed in the second valve body 14.

The check valve section 35 is installed to a lower portion of the hole of the first valve body 12, and it has, at a central portion, a cylindrical member 102 formed with a stepped through-hole 100 which extends in the axial direction. A fourth chamber 104 is formed between the inner wall surface of the first valve body 12 and the upper outer circumferential surface of the cylindrical member 102. A fifth chamber 106 is formed between the inner wall surface of the first valve body 12 and the lower outer circumferential surface of the cylindrical member 102.

The check valve 34, which has a tongue 108, is installed to an annular groove formed at an intermediate portion of the cylindrical member 102. The check valve 34 is designed as follows. That is, the communication between the fourth chamber 104 and the fifth chamber 106 is blocked by causing the deformation to allow the tongue 108 to make contact with the outer wall surface of the first valve body 12 in accordance with the action of the pressure fluid supplied from the side of the fourth chamber 104. On the other hand, when the tongue 108 is flexibly moved inwardly in accordance with the action of the pressure fluid supplied from the side of the fifth chamber 106, the fourth chamber 104 is communicated with the fifth chamber 106.

The fourth chamber 104 is formed to make communication with the stepped through-hole 40 of the flow rate-adjusting section 36 via the second passage 50 formed in the second valve body 14. The fifth chamber 106 is formed to make communication with the secondary port 30 via a hole 110 formed in the cylindrical member 102.

The pressure/flow rate control valve 10 according to this embodiment is basically constructed as described above. Next, its operation, function, and effect will be explained.

Figure 6:
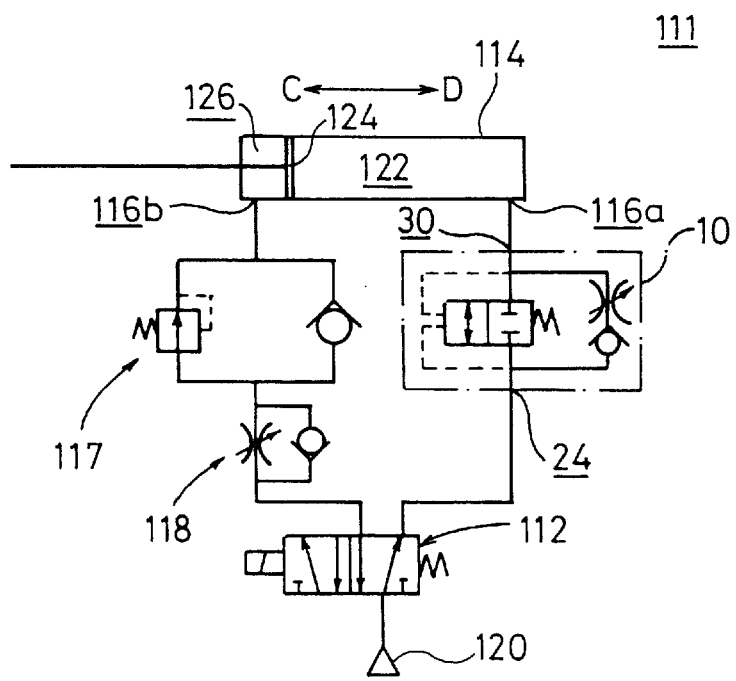
FIG. 6 shows a schematic arrangement of a fluid pressure circuit incorporated with the pressure/flow rate control valve shown in FIG. 1.

At first, a fluid pressure circuit 111 as shown in FIG. 6 is constructed by using the pressure/flow rate control valve 10 according to this embodiment. That is, the primary port 24 of the pressure/flow rate control valve 10 is connected to a directional control valve 112 by using an unillustrated tube, and the secondary port 30 is connected to a first port 116a of a cylinder 114. A check valve-equipped pressure-reducing valve 117 and a speed control valve 118 are inserted between a second port 116b of the cylinder 114 and the directional control valve 112. A pressure fluid supply source 120 is connected to the directional control valve 112.

In the fluid pressure circuit 111 constructed as described above, the pressure fluid (for example, compressed air) is supplied via the primary port 24 in accordance with the driving action of the pressure fluid supply source 120. In this situation, the valve plug 82 is in the valve-closed state in which it is seated on the annular projection 92 in accordance with the resilient force of the spring member 76.

The pressure fluid, which is supplied via the primary port 24, arrives at the first passage 26 and the first chamber 52, and it is introduced into the third chamber 96 of the valve-opening/closing section 32 via the fourth passage 56 and the fifth passage 98 communicating with the first chamber 52. The pressure fluid, which is introduced into the third chamber 96, has a high supply pressure. The pressure fluid constitutes the pilot pressure which acts on the pair of disk sections 88a, 88b and the packing 90 to press the valve plug 82 upwardly. As a result, the elastic member 80 of the valve plug 82 is separated from the annular projection 92 (seat section) against the resilient force of the spring member 76 to give the valve-open state. The pressure fluid is supplied to a head-side cylinder chamber 122 of the cylinder 114 via the stepped through-hole 100 and the secondary port 30. A piston 124 is displaced to the terminal end position in the direction of the arrow C.

The pressure fluid, which is supplied from the primary port 24, passes through the stepped through-hole 40 of the flow rate-adjusting section 36 via the first passage 26 and the first chamber 52, and it is introduced into the check valve section 35. However, the flow of the pressure fluid is blocked in accordance with the checking action of the check valve section 34.

Next, when the valve position of the directional control valve 112 is switched to displace the piston in a direction (direction of the arrow D) opposite to the above, the valve plug 82 is in the valve-open state in which it is separated from the seat section, because of the high pressure in the head-side cylinder chamber 122. The pressure fluid, which is introduced from the secondary port 30, passes through the hole 94 of the annular projection 92.

The pressure fluid is quickly exhausted to the atmospheric air from the directional control valve 112 via the third chamber 96, the fifth passage 98, the fourth passage 56, the first chamber 52, and the first passage 26.

The pressure of the pressure fluid, which is supplied to a rod-side cylinder chamber 126 via the port 116b to drive the cylinder 114, is sufficiently about a half of the pressure of the pressure fluid discharged from the port 116a. It is possible to save the power of the pressure fluid supplied to the cylinder 114.

Therefore, when the secondary pressure is lowered to be a pressure which is not more than a predetermined pressure set by the resilient force of the spring member 76, the elastic member 80 of the valve plug 82 is seated on the annular projection 92 to give the valve-closed state. As a result, the pressure fluid, which is supplied from the head-side cylinder chamber 122 of the cylinder 114 to pass through the secondary port 30, flows through the hole 110 of the cylindrical member 102 and the fifth chamber 106, and it flexibly bends the tongue 108 of the check valve 34 inwardly to pass through the check valve section 35. After that, the pressure fluid passes through the second passage 50, and it is introduced into the flow rate-adjusting section 36.

In the flow rate-adjusting section 36, the pressure fluid is throttled to have a predetermined flow rate in accordance with the preset spacing distance between the first end 48 of the adjusting screw member 42 and the inner wall surface of the stepped through-hole 40. Subsequently, the pressure fluid is led from the primary port 24 via the third passage 54 communicating with the stepped through-hole 40, the first chamber 52, and the first passage 26. Accordingly, the displacement speed is controlled for the piston 124 of the cylinder 114.

As described above, in this embodiment, the fluid pressure at the high pressure in the head-side cylinder chamber 122 is quickly exhausted in the valve-open state of the valve-opening/closing mechanism 74 until the pressure of the head-side cylinder chamber 122 and the pressure of the rod-side cylinder chamber 126 are held at the substantially identical pressure. After the valve-opening/closing mechanism 74 is in the valve-closed state, the piston 124 is displaced in the state in which the flow rate of the pressure fluid is controlled by the flow rate-adjusting section 36. Therefore, it is possible to prevent the operation delay of the piston 124 which would be otherwise caused by the difference in pressure between the pressure of the head-side cylinder chamber 122 and the pressure of the rod-side cylinder chamber 126. It is possible to decrease the time loss resulting from the operation delay.

In this embodiment, the tube joint section 22 is provided to detachably connect the tube member such as the tube. Further, as for the leading direction of the tube member, the tube member is freely led in all directions. Accordingly, it is possible to improve the convenience when the pressure/flow rate control valve is used.

Figure 7:
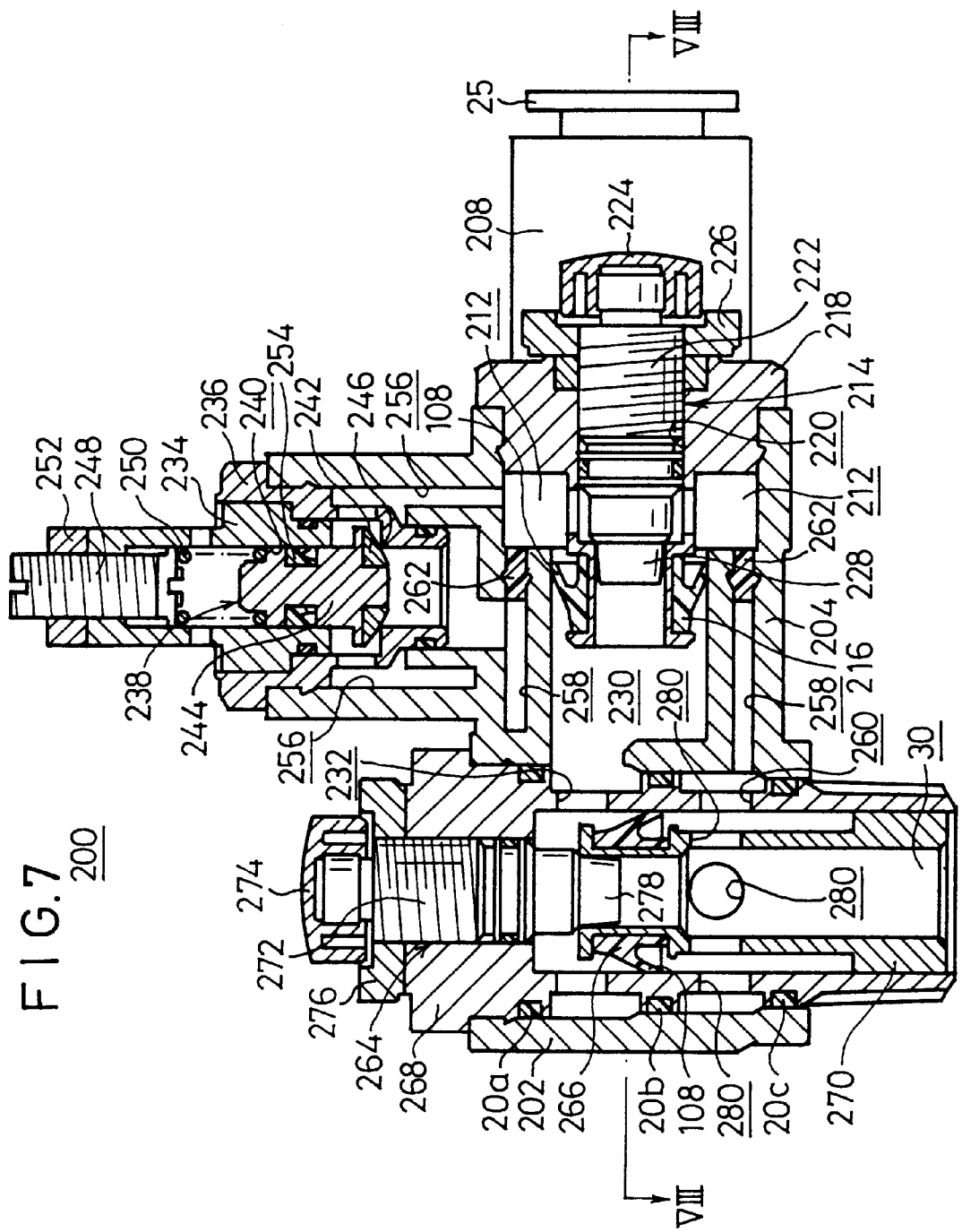
FIG. 7 shows a vertical sectional view taken in the axial direction illustrating a pressure/flow rate control valve according to another embodiment of the present invention.
Figure 8:
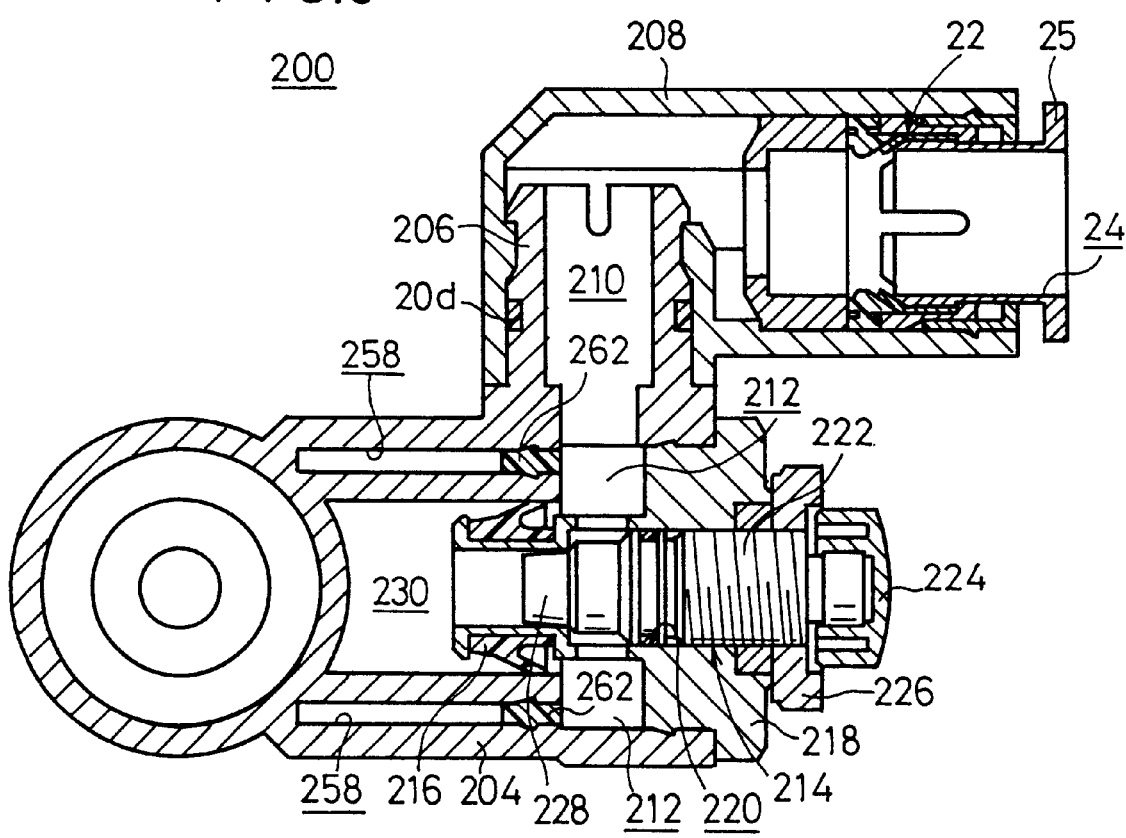
FIG. 8 shows a lateral sectional view taken along a line VIII—VIII shown in FIG. 7.

Next, a pressure/flow rate control valve 200 according to another embodiment of the present invention is shown in FIGS. 7 and 8. The same constitutive components as those of the embodiment described above are designated by the same reference numerals, detailed explanation of which will be omitted.

The pressure/flow rate control valve 200 comprises a second valve body 204 which is composed of two substantially cylindrical members integrally Joined in directions substantially perpendicular to one another and which is rotatable about a center of rotation of the axis of an internally fitted first valve body 202 having a cylindrical configuration, and a third valve body 208 which has a bent substantially L-shaped configuration and which is joined rotatably about a center of rotation of the axis of a projection 206 (see FIG. 8) of the second valve body 204.

The third valve body 208 is formed with a sixth passage 210 which is bent along the third valve body 208 and which communicates with the primary port 24. A hole, which substantially functions as a secondary port 30, is formed at the lower end of the first valve body 202.

A first flow rate-adjusting section 214 for throttling the pressure fluid introduced into the sixth chamber 212 communicating with the sixth passage 210 to have a predetermined flow rate and leading the pressure fluid to the secondary port 30, and a first check valve 216 for preventing the pressure fluid introduced from the primary port 24 from flowing toward the secondary port 30 are arranged coaxially at the inside of the second valve body 204.

The first flow rate-adjusting section 214 includes a first cap member 218 which is fitted to a hole of the second valve body 204, a first adjusting screw member 222 which extends along a stepped through-hole 220 formed at a central portion of the first cap member 218 and which is held rotatably in the stepped through-hole 220, a knob section 224 which is joined to a first end of the first adjusting screw member 222, and a nut member 226 for fixing the first adjusting screw member 222 at a desired position.

A second end 228 of the first adjusting screw member 222 is formed to have a substantially tapered configuration. The spacing distance between the second end 228 of the first adjusting screw member 222 and the inner wall surface of the stepped through-hole 220 is adjusted by increasing or decreasing the screwing amount of the first adjusting screw member 222 by the aid of the knob section 224. Therefore, the pressure fluid, which is supplied from the primary port 24, is throttled to have a predetermined flow rate in accordance with the spacing distance between the second end 228 of the first adjusting screw member 222 and the inner wall surface of the stepped through-hole 220. The first end of the stepped through-hole 220 is formed to make communication with an upper first communication passage 232 formed in the first valve body 202, via a seventh chamber 230.

A second cap member 236 is held at an upper portion of the second valve body 204 with a ring member 234 intervening therebetween. A valve-opening/closing mechanism 238, which functions as the valve-opening/closing section, is provided for the second cap member 236.

The valve-opening/closing mechanism 238 slides along a hole 240 which is formed in the second cap member 236. The valve-opening/closing mechanism 238 includes a valve plug 244 which is installed, at one end, with an elastic member 242 composed of, for example, a material such as natural rubber of synthetic rubber to have a substantially tapered cross section, a seat section 246 which is formed on the cap member 236 for seating the valve plug 244 thereon, a screw member 248 which is meshed with a thread portion of the second cap member 236, a spring member 250 which is inserted between the screw member 248 and the valve plug 244, and a nut member 252 for fastening the screw member 248. The screw member 248 functions to adjust and set the spring force of the spring member 250. A packing 254, which is made of a flexible material to have a substantially v-shaped cross section, is installed to an annular groove of the valve plug 244.

In this embodiment, the diameter of the hole which substantially functions as the seat section 246 is set to be substantially the same as the diameter of the hole 240 of the second cap member 236 along which the valve plug 244 makes sliding displacement. In other words, no difference in pressure-receiving area is provided for the valve plug 244 by setting the diameter of the hole of the seat section 246 to be substantially the same as the diameter of the hole 240 of the second cap member 236. Accordingly, even when the primary pressure is introduced via a seventh passage 256 which communicates with the sixth chamber 212, then the valve plug 244 is in the balanced state, and it is held in the state of being seated on the seat section 246.

An annular passage 258, which extends in the circumferential direction of the second valve body 204, is formed under the seat section 246. The annular passage 258 is provided to make communication with the secondary port 30 via a second communication passage 260 disposed on the lower side. An annular seal member 262 is inserted between the annular passage 258 and the sixth chamber 212 to give a non-communication state.

A second flow rate-adjusting section 264 for throttling the pressure fluid introduced via the first communication passage 232 to have a predetermined flow rate and leading the pressure fluid to the secondary port 30, and a second. check valve 266 for preventing the pressure fluid introduced from the secondary port 30 from flowing toward the primary port 24 are arranged coaxially at the inside of the first valve body 202.

The second flow rate-adjusting section 264 includes a third cap member 268 which is fitted to a hole of the first valve body 202, a second adjusting screw member 272 which has its first end facing the inside of a hole of a cylindrical member 270 internally fitted to the first valve body 202 and which is held rotatably in a hole of the third cap member 268, a knob section 274 which is joined to a second end of the second adjusting screw member 272, and a nut member 276 for fixing the second adjusting screw member 272 at a desired position.

A first end 278 of the second adjusting screw member 272 is formed to have a substantially tapered cross section. The spacing distance between the first end 278 of the second adjusting screw member 272 and the inner wall surface of the cylindrical member 270 is adjusted by increasing or decreasing the screwing amount of the second adjusting screw member 272 by the aid of the knob section 274. Therefore, the pressure fluid, which has passed through the first communication passage 232, is throttled to have a predetermined flow rate in accordance with the spacing distance between the first end 278 of the second adjusting screw member 272 and the inner wall surface of the cylindrical member 270. A plurality of circular holes 280, which communicate with the secondary port 30, are formed at an intermediate portion of the cylindrical member 270.

A second check valve 266 is externally fitted to a first end of the cylindrical member 270. The second check valve 266 is deformed in accordance with the action of the pressure fluid supplied from the secondary port 30 and introduced via the circular holes 280 so that its tongue 108 contacts with the inner wall surface of the first valve body 202 to block the flow toward the primary port 24. On the other hand, when the tongue 108 is flexibly bent inwardly in accordance with the action of the pressure fluid passed through the first communication passage 232, the pressure fluid, which has passed through the first communication passage 232, is led to the secondary port 30.

Figure 10:
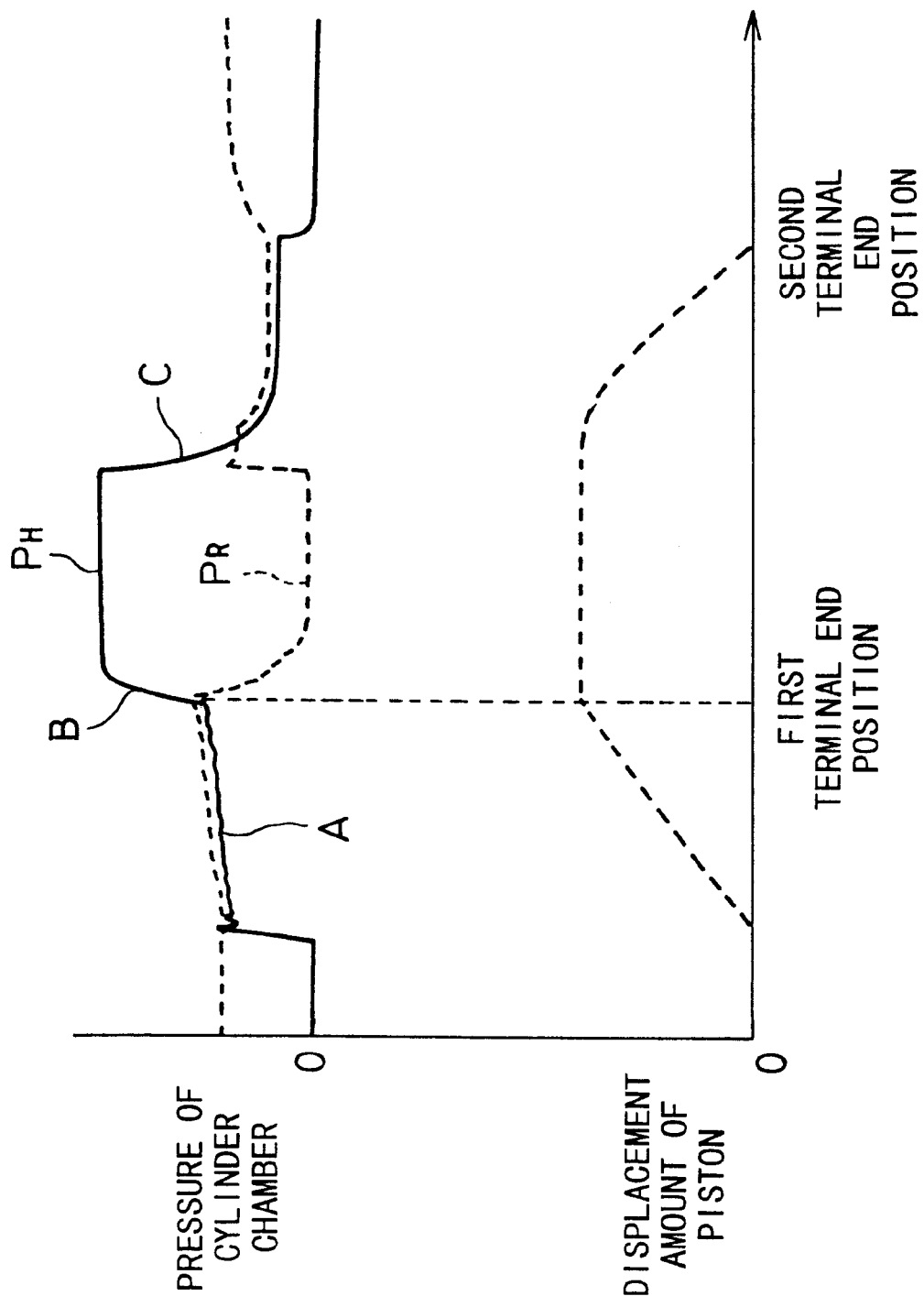
FIG. 10 illustrates characteristic curves of the pressure/flow rate control valve shown in FIG. 7.

The pressure/flow rate control valve 200 according to the another embodiment of the present invention is basically constructed as described above. Next, its operation, function, and effect will be explained. FIG. 10 shows the relationship between the displacement amount of the piston 124 and the pressures of the head-side cylinder chamber 122 and the rod-side cylinder chamber 126 of the cylinder 114 in the pressure/flow rate control valve 200 according to the another embodiment. $P_H$ indicates a characteristic curve of the pressure of the head-side cylinder chamber 122, and $P_R$ indicates a characteristic curve of the pressure of the rod-side cylinder chamber 126. The operation of the pressure/flow rate control valve 200 will be explained below in relation to the characteristic curves $P_H$ and $P_R$.

Figure 9:
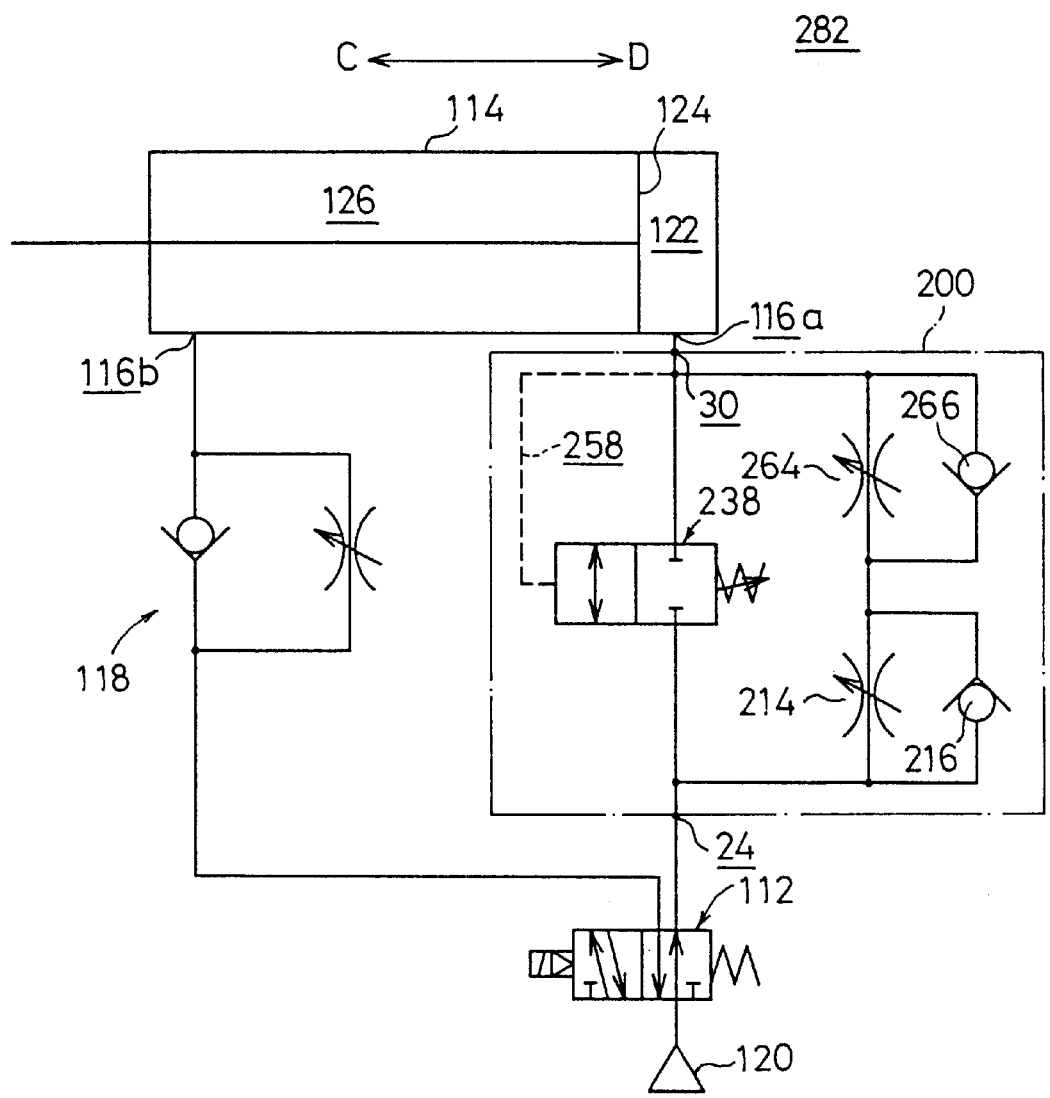
FIG. 9 shows a schematic arrangement of a fluid pressure circuit incorporated with the pressure/flow rate control valve shown in FIG. 7.

At first, a fluid pressure circuit 282 as shown in FIG. 9 is constructed by incorporating the pressure/flow rate control valve 200 according to the another embodiment. In the fluid pressure circuit 282, the pressure fluid (for example, compressed air) is supplied via the primary port 24 in accordance with the driving action of the pressure fluid supply source 120. In this case, the valve plug 244 is in the valve-closed state in which it is seated on the seat section 246 in accordance with the action of the resilient force of the spring member 250.

The pressure fluid, which is supplied via the primary port 24, is introduced into the valve-opening/closing mechanism 238 via the sixth passage 210, the sixth chamber 212, and the seventh passage 256. As described above, the difference in pressure-receiving area is not provided for the valve plug 244 by setting the diameter of the hole of the seat section 246 to be substantially the same as the diameter of the hole 240 of the second cap member 236. Therefore, even when the primary pressure is introduced into the valve-opening/closing mechanism 238, then the valve plug 244 is in the balanced state, and it is held in the state of being seated on the seat section 246.

On the other hand, the pressure fluid, which is supplied via the primary port 24, is introduced into the first flow rate-adjusting section 214 via the sixth passage 210 and the sixth chamber 212. The pressure fluid is throttled to have the predetermined flow rate, and then it is introduced into the second flow rate-adjusting section 264 via the seventh chamber 230 and the first communication passage 232. The pressure fluid, which is introduced into the sixth chamber 212, is prevented from flowing toward the secondary port 30 in accordance with the checking action of the first check valve 216.

The pressure fluid, which is introduced into the second flow rate-adjusting section 264, is throttled to have the predetermined flow rate, and then it is supplied to the head-side cylinder chamber 122 of the cylinder 114 via the circular holes 280 and the secondary port 30. Accordingly, the piston 124 is displaced to the first terminal end position in the direction of the arrow C.

As described above, the pressure fluid, which is supplied to the head-side cylinder chamber 122 of the cylinder 114, is sufficiently throttled for its flow rate by the aid of the first flow rate-adjusting section 214 and the second flow rate-adjusting section 264. Therefore, even when the pressure of the rod-side cylinder chamber 126 is low, it is possible to reliably avoid the occurrence of the so-called jumping out phenomenon of the piston (see the characteristic curve A shown in FIG. 10).

Subsequently, the pressure of the head-side cylinder chamber 122 is increased after the piston 124 arrives at the first terminal end position. The pressure fluid at the high pressure is introduced into the valve-opening/closing mechanism 238 via the secondary port 30, the second communication passage 260, and the annular passage 258. Accordingly, the valve plug 244 is moved upwardly, and it is separated from the seat section 246. Thus, the valve-opening/closing mechanism 238 is in the valve-open state.

Therefore, the pressure fluid, which is introduced from the primary port 24, is quickly supplied to the head-side cylinder chamber 122 of the cylinder 114 via the sixth passage 210, the sixth chamber 212, the seventh passage 256, the annular passage 258, the second communication passage 260, the circular holes 280, and the secondary port 30 mutually communicating with each other (see the characteristic curve B shown in FIG. 10). As a result, after the piston 124 arrives at the first terminal end position, the valve-opening/closing mechanism 238 is operated to makes it possible to quickly supply the pressure fluid at the high pressure to the head-side cylinder chamber 122. Therefore, for example, when the present invention is applied to an unillustrated clamp cylinder, it is possible to increase the force for clamping a workpiece by means of an arm.

Subsequently, when the valve position of the directional control valve 112 is switched to displace the piston 124 in a direction (direction of the arrow D) opposite to the above, the valve plug 244 is in the valve-open state in which it is separated from the seat section 246, because the pressure of the head-side cylinder chamber 122 is high. The pressure fluid, which is introduced from the secondary port 30, is quickly exhausted to the atmospheric air from the directional control valve 112 via the circular holes 280, the second communication passage 260, the annular passage 258, the seventh passage 256, the sixth chamber 212, the sixth passage 210, and the primary port 24 mutually communicating with each other (see the characteristic curve C shown in FIG. 10).

Therefore, the secondary pressure is lowered to a pressure which is not more than the predetermined pressure set by the resilient force of the spring member 250. Accordingly, the valve plug 244 is seated on the seat section 246 to give the valve-closed state. As a result, the pressure fluid, which is supplied from the head-side cylinder chamber 122 of the cylinder 114 to pass through the secondary port 30, is throttled to have the predetermined flow rate by the aid of the second flow rate-adjusting section 264 and the first flow rate-adjusting section 214, and it is led from the primary port 24. Thus, the displacement speed is controlled for the piston 124 of the cylinder 114.

As described above, in the another embodiment, it is possible to reliably avoid the occurrence of the so-called Jumping out phenomenon of the piston 124. Further, after the piston 124 arrives at the first terminal end position, the primary pressure can be quickly supplied, and the secondary pressure can be quickly exhausted. Therefore, any delay of pressure transmission is dissolved.

Next, FIG. 11 shows a characteristic curve of a pressure/flow rate control valve (not shown) concerning an exemplary conventional technique. As clearly understood from FIG. 11, in the case of the exemplary conventional technique, the pressure value of the pressure fluid, which is supplied to the head-side cylinder chamber 122 of the cylinder, is suddenly increased. Therefore, the so-called jumping out phenomenon of the piston 124 occurs.

On the contrary, as shown in FIG. 10, in the another embodiment, the flow rate of the pressure fluid supplied from the primary port 24 is throttled by the first flow rate-adjusting section 214 and the second flow rate-adjusting section 264. Therefore, the sudden increase in the pressure of the pressure fluid supplied to the head-side cylinder chamber 122 of the cylinder 114 is suppressed, and the so-called jumping out phenomenon of the piston 124 is avoided.

What is claimed is:

1. A pressure/flow rate control valve comprising:
 a first valve body formed to have a cylindrical configuration with a secondary port formed at a first end;

a second valve body including two cylindrical members joined integrally in directions substantially perpendicular to one another, said second valve body being rotatable about a center of rotation of said first valve body;

a third valve body formed to have a substantially bent L-shaped configuration, said third valve body being rotatable about a center of rotation of a projection of said second valve body;

a tube joint section arranged in said third valve body and provided with a tube joint for detachably connecting a tube member to a primary port;

a flow rate-adjusting section arranged in said second valve body, for adjusting a pressure fluid flowing through a passage communicating with said primary port to have a predetermined flow rate;

a valve-opening/closing section arranged on a first end side of said first valve body, for opening/closing a first communication passage for making communication between said primary port and a secondary port; and a check valve section arranged on a second end side of said first valve body, for allowing only said pressure fluid directed from said secondary port to said flow rate-adjusting section to flow therethrough via a second communication passage, wherein:

said valve-opening/closing section includes a valve plug with an elastic member having a tapered cross section installed to its first end, a stem installed with a packing, for making displacement integrally with said valve plug, and a spring member fastened to a first end of said stem, for pressing said valve plug toward an annular projection formed on an inner wall surface of said first valve body; and a valve-closed state is given when said valve plug is seated on said annular projection in accordance with an action of resilient force of said spring member, while a valve-open state is given when said valve plug is separated from said annular projection against said resilient force of said spring member by using said pressure fluid supplied from said primary port to provide a pilot pressure.

2. The pressure/flow rate control valve according to claim 1, wherein said primary port is provided at said tube joint section to which said tube member is detachably connected, and said tube member is attached detachably in all directions.

3. The pressure/flow rate control valve according to claim 1, wherein said first communication passage and said second communication passage are formed to have cross-sectional configurations such that they are separated from each other by a predetermined spacing distance corresponding to a contour on a first end side and a contour on a second end side of said second valve body respectively.

4. A pressure/flow rate control valve comprising:

a main valve body having a primary port and a secondary port;

a valve-opening/closing section provided for said main valve body, for opening/closing a communication passage between said primary port and said secondary port;

a first flow rate-adjusting section provided with a first check valve for blocking flow of a pressure fluid from said primary port to said secondary port, said first check valve forcing said pressure fluid introduced from said primary port to flow through a first adjustable opening for adjusting said pressure fluid introduced from said primary port to have a predetermined flow rate; and a second flow rate-adjusting section provided with a second check valve for blocking flow of said pressure fluid from said secondary port to said primary port, and having a second adjustable opening for further adjusting said pressure fluid passed through said first flow rate-adjusting section to have a predetermined flow rate, wherein said valve-opening/closing section and said first and second flow rate-adjusting sections are provided in parallel to make communication and connection with each other between said primary port and said secondary port respectively.

5. The pressure/flow rate control valve according to claim 4, wherein said valve-opening/closing section includes a cap member installed to said main valve body, a valve plug for making sliding displacement along a hole of said cap member, a seat section for seating said valve plug thereon, and a spring member for urging said valve plug toward said seat section; and said hole of said cap member for making said sliding movement of said valve plug has a diameter which is set to be substantially the same as a diameter of said seat section.

6. The pressure/flow rate control valve according to claim 5, wherein said primary port is provided at a tube joint section to which a tube member is detachably connected, and said tube member is attached detachably in all directions.

* * * * *